(12) United States Patent
Ikeda

(10) Patent No.: US 8,164,646 B2
(45) Date of Patent: Apr. 24, 2012

(54) IMAGE CAPTURING APPARATUS, IMAGE CAPTURING SENSOR, AND IMAGE CAPTURING PROCESSING METHOD

(75) Inventor: Eiichiro Ikeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 146 days.

(21) Appl. No.: 12/508,486

(22) Filed: Jul. 23, 2009

(65) Prior Publication Data

US 2009/0284614 A1 Nov. 19, 2009

Related U.S. Application Data

(63) Continuation of application No. 11/376,808, filed on Mar. 15, 2006, now Pat. No. 7,609,298.

(30) Foreign Application Priority Data

Mar. 15, 2005 (JP) ................................. 2005-073235

(51) Int. Cl.
*H04N 5/228* (2006.01)
*H01L 27/00* (2006.01)
*H01L 31/062* (2006.01)

(52) U.S. Cl. .................... 348/222.1; 250/208.1; 257/290
(58) Field of Classification Search ............... 348/218.1, 348/221.1, 239, 273, 280; 250/208.1; 257/290–291
See application file for complete search history.

(56) References Cited

U.S. PATENT DOCUMENTS

| 6,567,571 | B1 | 5/2003 | Kochi et al. |
| 6,661,451 | B1 * | 12/2003 | Kijima et al. ............. 348/220.1 |
| 6,686,960 | B2 | 2/2004 | Iizuka |
| 6,992,714 | B1 | 1/2006 | Hashimoto et al. |
| 7,002,630 | B1 | 2/2006 | Iizuka |
| 7,170,556 | B2 | 1/2007 | Kokubun et al. |
| 7,262,793 | B2 | 8/2007 | Nakajima et al. |
| 7,263,215 | B2 | 8/2007 | Nishio et al. |
| 7,349,016 | B2 | 3/2008 | Fujii et al. |
| 7,352,397 | B2 | 4/2008 | Nishio et al. |
| 7,400,353 | B2 * | 7/2008 | Hatano ......................... 348/308 |
| 7,456,876 | B2 | 11/2008 | Funakoshi et al. |
| 7,479,994 | B2 * | 1/2009 | Yang et al. .................... 348/241 |
| 7,492,403 | B2 * | 2/2009 | Nam ............................. 348/311 |

(Continued)

FOREIGN PATENT DOCUMENTS

CN 1536895 A 10/2004

(Continued)

OTHER PUBLICATIONS

URL;http://www.sony.co.jp/Products/SC-HP/image device/ccd/tec vga.html "CCD in Focus: Sony CCD Sensor".

(Continued)

*Primary Examiner* — Trung Diep
(74) *Attorney, Agent, or Firm* — Canon U.S.A., Inc. I.P. Division

(57) ABSTRACT

This invention is directed to reduce a deterioration in image quality after thinning operation when pixels are read out upon thinning. An image sensor is designed such that different gains are applied on a pixel basis. After periodical gains are applied to the respective pixels, the pixels of the same colors are added and averaged to obtain a low-pass filter effect before thinning processing for the pixels in the sensor, thereby preventing the occurrence of aliasing (moiré) due to thinning.

4 Claims, 12 Drawing Sheets

U.S. PATENT DOCUMENTS

| | | |
|---|---|---|
| 7,715,617 B2 | 5/2010 | Nishio et al. |
| 2004/0016919 A1 | 1/2004 | Daiku et al. |
| 2004/0017493 A1 | 1/2004 | Daiku et al. |
| 2004/0017495 A1 | 1/2004 | Funakoshi et al. |
| 2004/0041919 A1* | 3/2004 | Yamanaka ............... 348/222.1 |
| 2004/0119854 A1 | 6/2004 | Funakoshi et al. |
| 2004/0196396 A1 | 10/2004 | Fujii et al. |
| 2004/0212689 A1 | 10/2004 | Nakajima et al. |
| 2006/0055794 A1 | 3/2006 | Sato et al. |

FOREIGN PATENT DOCUMENTS

| | | |
|---|---|---|
| JP | 2000-032481 A | 1/2000 |
| JP | 2003-333610 A | 11/2003 |
| JP | 2004-112738 A | 4/2004 |

OTHER PUBLICATIONS

Office Action dated Aug. 31, 2007, concerning corresponding Chinese Patent Application No. 200610059806.3.

* cited by examiner

ADDING OPERATION ON R-G1 LINE

ADDING OPERATION ON G2-B LINE

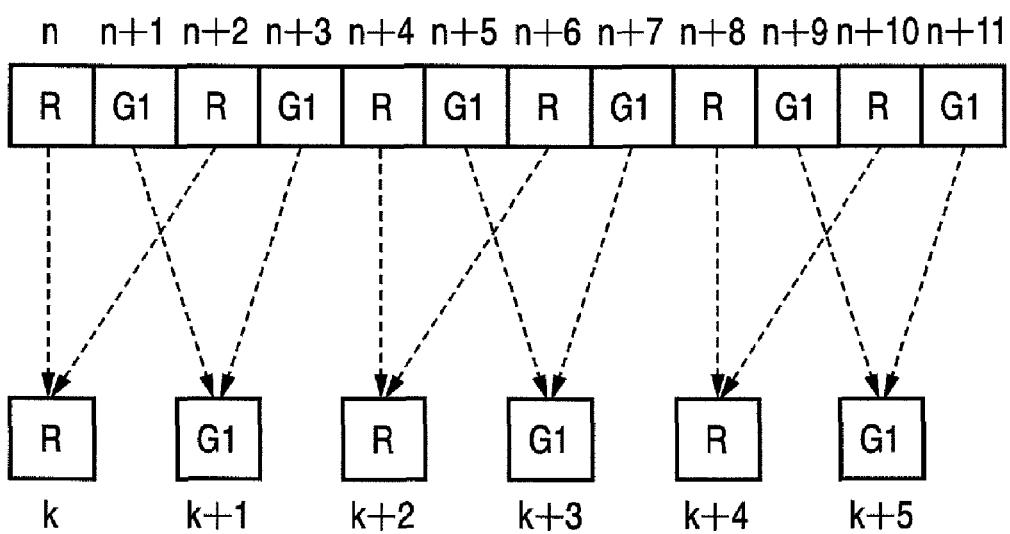
F I G. 12

IMAGE CAPTURING APPARATUS, IMAGE CAPTURING SENSOR, AND IMAGE CAPTURING PROCESSING METHOD

CROSS REFERENCE TO RELATED APPLICATIONS

This application is a continuation of U.S. patent application Ser. No. 11/376,808 filed Mar. 15, 2006, which claims the benefit of Japanese Patent Application No. 2005-073235 filed on Mar. 15, 2005, which are hereby incorporated by reference herein their entirety.

FIELD OF THE INVENTION

The present invention relates to an image capturing apparatus, image sensor, and image capturing processing method and, more particularly, to a technique suitably used for adding/thinning processing for pixels.

BACKGROUND OF THE INVENTION

Conventionally, there has been available a moving image reading mode (see the CCD reading method (the horizontal & vertical pixel addition technique (corresponding to VGA moving images)); see Internet <URL:http://www.sony.co.jp/Products/SC-HP/imagingdevice/ccd/tec vga.html>) of reading out pixels from an image sensor at high speed by pixel adding/thinning operation, in addition to a frame reading mode of sequentially reading out all pixels from the image sensor for still image photography. FIG. 11 is a view for explaining a conventional method of reading out signals from a general-purpose CCD image sensor in the moving image photography mode.

Referring to FIG. 11, after pixels are exposed, two pixels of the same color are added at a time in a vertical shift register. For example, pixels corresponding to numbers V in the vertical direction which satisfy V=10n (where n is 0 or a positive integer) and V=10n+2 are added, and pixels which satisfy V=10n+5 and V=10n+7 are added. The remaining pixels are not read out. Image signals added by a vertical shift register are transferred to a horizontal shift register.

In the horizontal shift register, pixels of the same color corresponding to numbers H in the horizontal direction which satisfy H=4m (m is 0 or a positive integer) and H=4m+2 are added, and pixels of the same color which satisfy H=4m+1 and H=4m+3 are added. The resultant pixel data are output.

Such an image sensor outputs pixel data such that the number of pixels in the vertical direction is reduced to ⅕, and the number of pixels in the horizontal direction is reduced to ½.

In adding processing performed in the above manner, for example, as shown in FIG. 12, when G1[n+1] and G1[n+3] are added to output G1[K+1] and R[n] and R[n+2] are added to output R[K], a pixel coordinate inversion phenomenon occurs at G1[n+1] and R[n+2]. This results in the occurrence of jaggies (a stair-step pattern) on a fine object image.

More specifically, when pixels having undergone the above adding processing are thinned and reduced to be output as, for example, a VGA-size image, jaggies are made less noticeable. In contrast to this, as the size of an output image increases, the influence of jaggies increases. If, therefore, the size of an output image increases, a great deterioration in image quality may occur.

As described above, according to an addition reading method in a conventional image capturing apparatus, when, for example, a G1-R line is taken into consideration, the positional relationship between G1[n+1] and R[n+2] is reversed, as shown in FIG. 12. As a consequence, jaggies appear on an oblique line or the like, resulting in a great deterioration in image quality.

In general, in sampling an image, if the signal band of an original image is not reduced to a frequency (Nyquist frequency) ½ the sampling frequency, an aliasing signal is produced in a low-frequency signal. According to the addition reading method shown in FIGS. 11 and 12, pixel data are read out while the number of pixels in the horizontal direction is reduced to ½, and the number of pixels in the vertical direction is reduced to ⅕.

However, the above addition of pixels alone cannot sufficiently suppress the band of an original image. As a result, an aliasing signal is produced in a low-frequency signal.

SUMMARY OF THE INVENTION

The present invention has been made in consideration of the above problems and has as its first object to reduce a deterioration in image quality after thinning operation when pixels are read out upon thinning.

It is a second object of the present invention to reduce aliasing which occurs after thinning operation.

It is a third object of the present invention to reduce jaggies which are produced after thinning operation.

According to a first aspect of the present invention, there is provided an image capturing apparatus comprising signal amplifying means for amplifying pixel signals with amplification factors having a regular pattern set for a plurality of pixels arranged in the form of a matrix, pixel mixing means for mixing the pixel signals of the same colors amplified by the signal amplifying means, and pixel thinning means for thinning and outputting the pixel signals mixed by the pixel mixing means.

According to a second aspect of the present invention, there is provided an image sensor comprising a plurality of pixels arranged in the form of a matrix, signal amplification means for amplifying pixel signals with amplification factors having a regular pattern set for the plurality of pixels, pixel mixing means for mixing output signals from the photoelectric conversion unit for each pixel of the same color, and pixel thinning means for thinning pixel signals mixed by the pixel mixing means with a predetermined thinning ratio.

According to a third aspect of the present invention, there is provided an image capturing processing method comprising a signal amplifying step of amplifying pixel signals with amplification factors having a regular pattern set for a plurality of pixels arranged in the form of a matrix, a pixel mixing step of mixing the pixel signals of the same colors amplified in the signal amplifying step, and a pixel thinning step of thinning and outputting the pixel signals mixed in the pixel adding and averaging step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 12 is a view conceptually showing how adding and averaging operation is performed in an image sensor according to the prior art.

DETAILED DESCRIPTION OF THE PREFERRED EMBODIMENTS

The embodiments of the present invention will be described next with reference to the accompanying drawings.

First Embodiment

Figure 1:
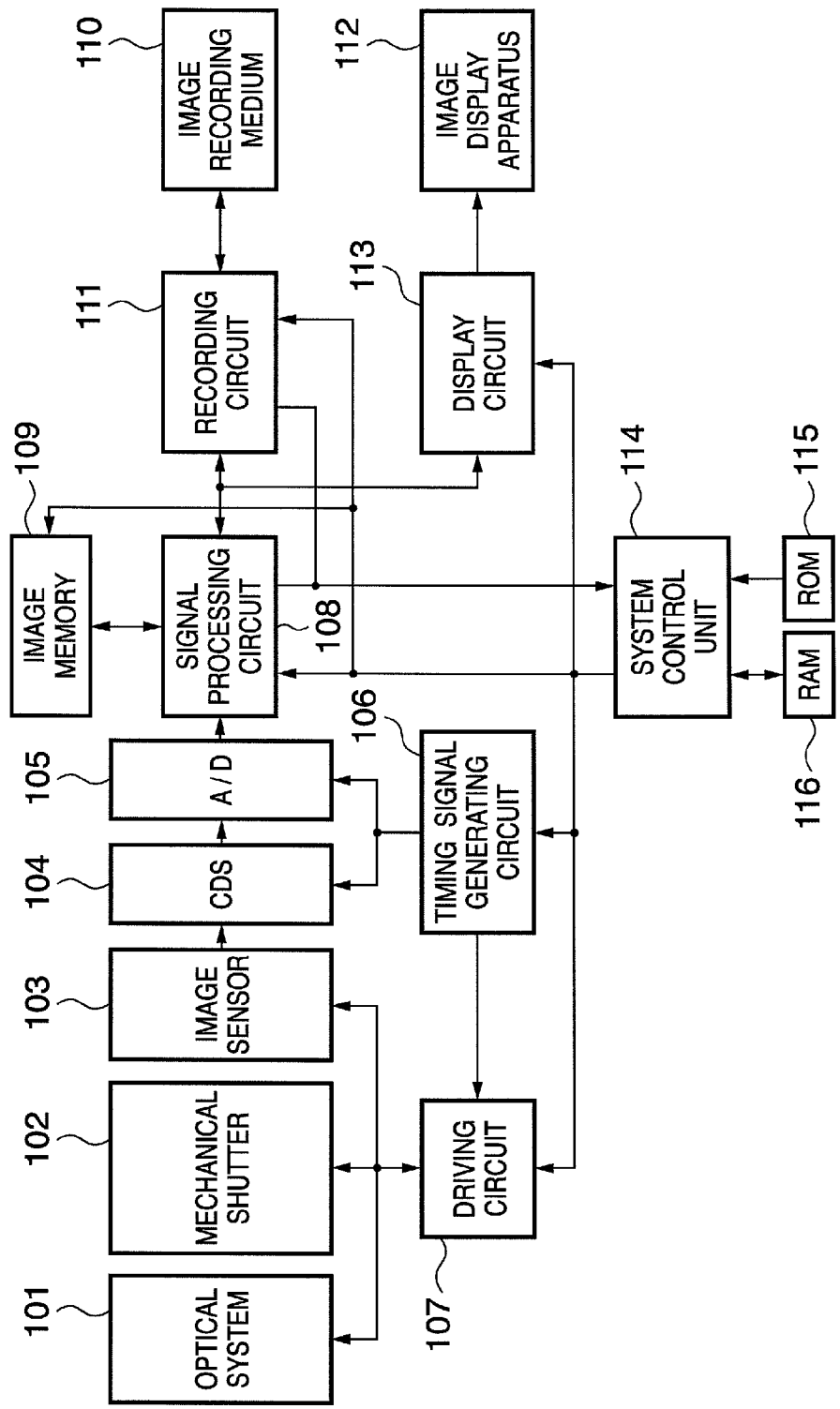
FIG. 1 is a block diagram showing an example of the hardware arrangement of an image capturing apparatus according to the first embodiment of the present invention.

An example of the hardware arrangement of an image capturing apparatus according to this embodiment will be described first with reference to FIG. 1.

Reference numeral 101 denotes an optical system comprising a lens and a stop; 102, a mechanical shutter; and 103, an image sensor. The image sensor 103 in this embodiment includes a color filter having a primary color Bayer pattern. Reference numeral 104 denotes a CDS circuit which performs analog signal processing; and 105, an A/D converter which converts an analog signal into a digital signal.

Reference numeral 106 denotes a timing signal generating circuit which generates signals for operating the image sensor 103, the CDS circuit 104, and the A/D converter 105; 107, a driving circuit for the optical system 101, mechanical shutter 102, and image sensor 103; 108, a signal processing circuit which performs signal processing necessary for captured image data; and 109, an image memory which stores image data having undergone signal processing.

Reference numeral 110 denotes an image recording medium detachable with respect to the image capturing apparatus; 111, a recording circuit which records image data having undergone signal processing on the image recording medium 110; 112, an image display apparatus which displays image data having undergone signal processing; and 113, a display circuit which causes the image display apparatus 112 to display an image.

Reference numeral 114 denotes a system control unit which controls the overall image capturing apparatus; and 115, a non-volatile memory (ROM). The non-volatile memory (ROM) 115 stores, for example, a program describing a control method executed by the system control unit 114, control data such as parameters and tables which are used when the program is executed, and correction data for flaw addresses and the like. Reference numeral 116 denotes a volatile memory (RAM). The program, control data, and correction data stored in the non-volatile memory 115 are transferred and stored in the volatile memory (RAM) 116 in advance to allow the system control unit 114 to use them when controlling the image capturing apparatus.

An example of the image capturing operation performed by the image capturing apparatus having the above arrangement using the mechanical shutter 102 will be described next.

Assume that before image capturing operation, at the start of operation of the system control unit 114, e.g., at power-on of the image capturing apparatus, the system control unit 114 transfers necessary programs, control data, and correction data from the non-volatile memory 115 to the volatile memory 116 and stores them therein in advance.

Assume also that such programs and data are used by the system control unit 114 to control the image capturing apparatus, and additional programs and data are transferred from the non-volatile memory 115 to the volatile memory 116 as needed, or the system control unit 114 directly reads out data from the non-volatile memory 115 and uses them.

First of all, the optical system 101 drives the stop and the lens in accordance with control signals from the system control unit 114 to form an object image on the image sensor 103 with properly set brightness. The mechanical shutter 102 is then driven by a control signal from the system control unit 114 to shield the image sensor 103 from light in accordance with the operation of the image sensor 103 so as to set a necessary exposure time. If the image sensor 103 has an electronic shutter function, the function may be used together with the mechanical shutter 102 to ensure a necessary exposure time.

The image sensor 103 is driven by a driving pulse based on an operation pulse generated by the timing signal generating circuit 106 controlled by the system control unit 114. The image sensor 103 converts an object image into an electrical signal by photoelectric conversion and outputs it as an analog image signal. The analog image signal output from the image sensor 103 is converted into a digital image signal by the A/D converter 105 after clock synchronous noise is removed from the signal by the CDS circuit 104 in accordance with an operation pulse generated by the timing signal generating circuit 106 controlled by the system control unit 114.

The signal processing circuit 108 controlled by the system control unit 114 then performs image processing such as color conversion, white balance, and gamma correction, resolution conversion processing, image compression processing, and the like for the digital image signal. The image memory 109 is used to temporarily store a digital image signal during signal processing or store image data as a digital image signal having undergone signal processing. The image data having undergone signal processing in the signal processing circuit 108 or the image data stored in the image memory 109 is converted into data (e.g., file system data having a hierarchical structure) suitable for the image recording medium 110 by the recording circuit 111 and recorded on the image recording medium 110. Alternatively, this signal is subjected to resolution conversion processing in the signal processing circuit 108, and the resultant data is converted into a signal (e.g., an NTSC analog signal) suitable for the image display apparatus 112 by the display circuit 113 and displayed on the image display apparatus 112.

In this case, the signal processing circuit 108 may output a digital image signal as image data to the image memory 109 or the recording circuit 111 without performing signal processing in accordance with a control signal from the system control unit 114. Upon receiving a request from the system control unit 114, the signal processing circuit 108 outputs the information of a digital image signal or image data generated in the process of signal processing, e.g., the information of the spatial frequency of an image, the average value of a designated region, and the data amount of a compressed image, or information extracted therefrom to the system control unit 114. In addition, upon receiving a request from the system control unit 114, the recording circuit 111 outputs information, e.g., the type and remaining capacity of the image recording medium 110, to the system control unit 114.

Figure 2:
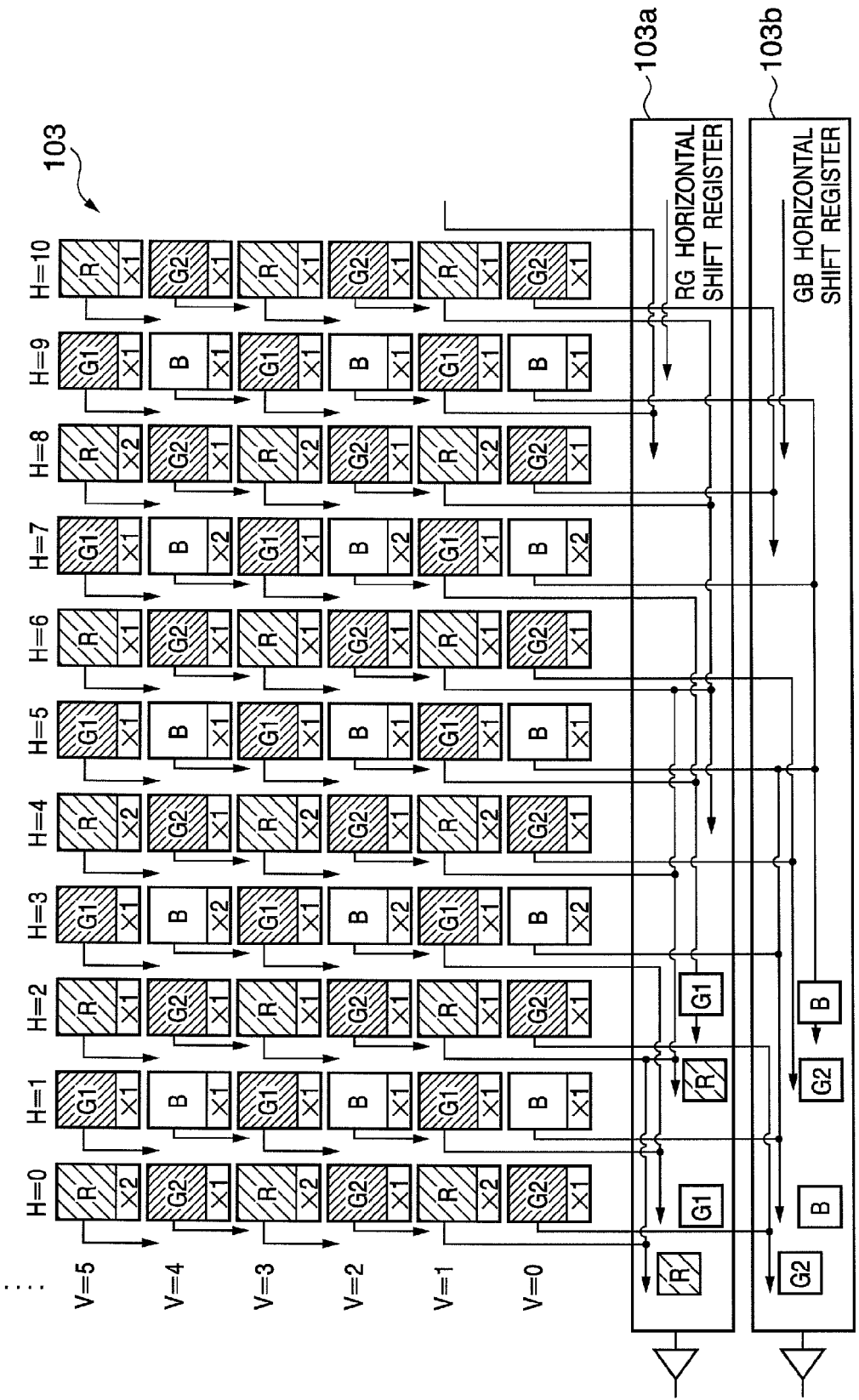
FIG. 2 is a view conceptually showing an example of a reading method in an addition mode according to the first embodiment of the present invention.
Figure 3:
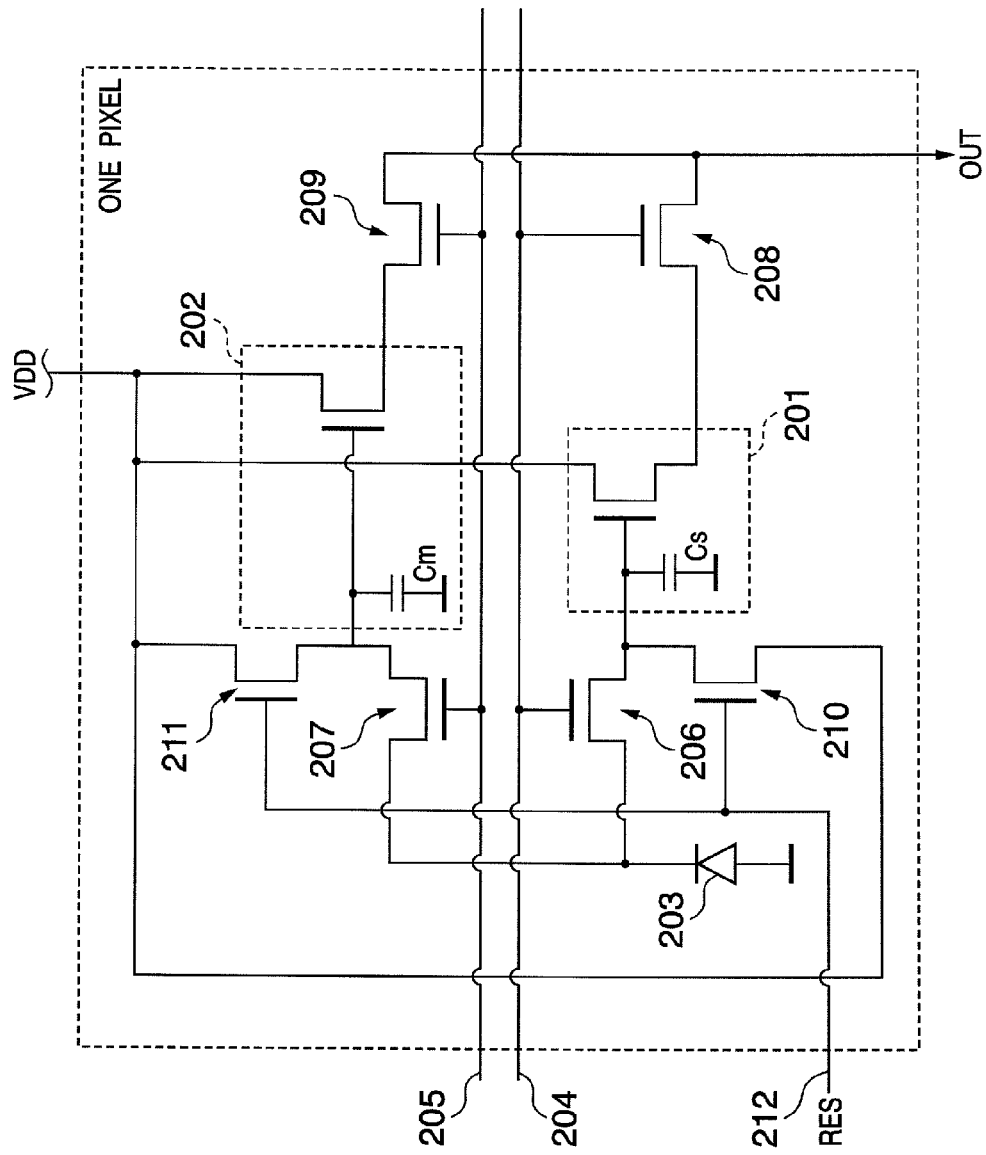
FIG. 3 is a circuit diagram showing an example of the pixel structure of an image sensor according to the first embodiment of the present invention.

FIG. 2 is a view conceptually showing a reading method in the addition mode in the image capturing apparatus according to this embodiment having the above arrangement. FIG. 3 is a view showing an example of the pixel structure of the image sensor according to this embodiment. Note that FIG. 2 shows an example in which the image sensor has a plurality of pixels arranged in the form of a 6 (row)×11 (column) matrix. Referring to FIG. 2, R, G1, G2, and B represent the colors of pixels (R representing red; G1 and G2, green; and B, blue), and "x1" and "x2" shown under R, G1, G2, and B represent gains (amplification factors) applied to the respective pixels. The main operation of the image capturing apparatus according to this embodiment will be described below with reference to FIGS. 2 and 3.

(Step 1-1)

First of all, an object image passing through the optical system 101 upon exposure operation is formed on the image sensor 103 shown in FIG. 2. As shown in FIG. 3, a photodiode 203 placed in each pixel of the image sensor 103 outputs an electrical signal (current) corresponding to a light amount.

As compared with a conventional image sensor, the image sensor 103 of this embodiment is mainly characterized by including amplifiers (a normal mode amplifier 201 and an addition mode amplifier 202) capable of applying different gains for each pixel. In reading operation in the normal mode, transistors 206 and 208 are turned on by a still image select (s select) signal 204, and an electrical signal output from the photodiode 203 is amplified by the normal mode amplifier 201 on the capacitor Cs side, thereby obtaining a pixel output signal.

In reading operation in the addition mode, transistors 207 and 209 are turned on by an addition select (m select) signal 205, an electrical signal is amplified by the addition mode amplifier 202 on the capacitor Cm side, thereby obtaining a pixel output signal.

Note that each pixel is reset by using reset MOS transistors 210 and 211 which are turned on by a reset signal 212.

(Step 1-2)

Referring to FIG. 2, on an R-G1 line (a line whose number V in the vertical direction is an odd number, V=2m+1 (where m is 0 or a positive integer)), the addition mode amplifier 202 applies a x2 gain to an R pixel at a position where a number H in the horizontal direction satisfies H=4n (where n is 0 or a positive integer).

On a G2-B line (a line whose number V in the vertical direction is an even number, V=2m (where m is 0 or a positive integer)), the addition mode amplifier 202 applies a x2 gain to a B pixel at a position where a number H in the horizontal direction satisfies H=4n+3 (where n is 0 or a positive integer). Assume that the gain amount at each of the remaining pixels is x1.

(Step 1-3)

Vertical transfer is started.

(Step 1-4)

In an RG horizontal shift register 103a and GB horizontal shift register 103b, pixels of the same colors are added. At this time, pixel values from even-numbered and odd-numbered lines in the vertical direction are transferred to different horizontal shift registers (the RG horizontal shift register 103a and the GB horizontal shift register 103b), and different pixel adding operations are executed in the respective registers. The resultant data are then transferred in the horizontal direction.

An example of pixel adding operation on the R-G1 (a line whose number V in the vertical direction in FIG. 2 is an odd number) will be described below.

Figure 4A:
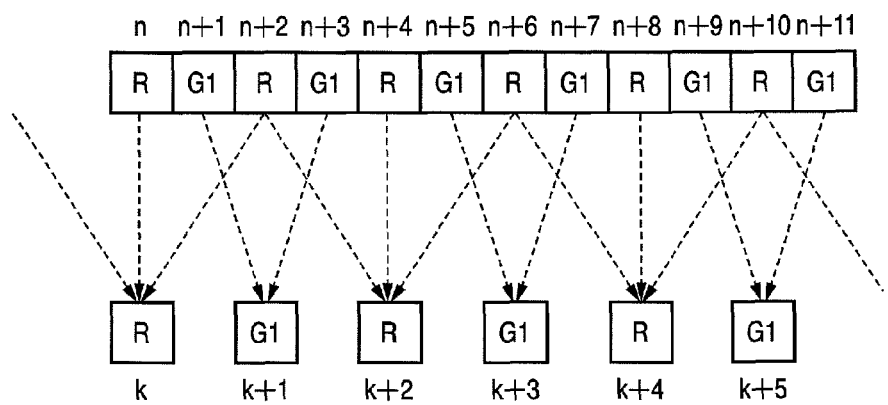
FIGS. 4A and 4B are views conceptually showing how adding and averaging operation is performed in the image sensor according to the first embodiment of the present invention.
Figure 4B:
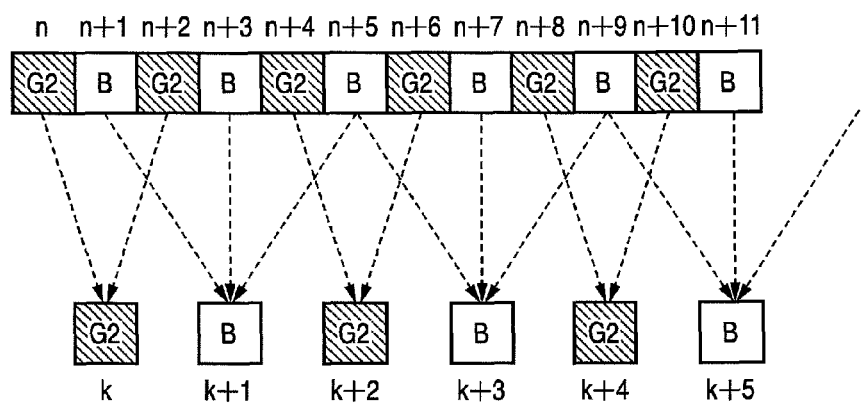

Two adjacent pixels G1 of the same color are added and averaged, and the resultant pixel is transferred to the RG horizontal shift register 103a. FIGS. 4A and 4B are views conceptually showing how adding and averaging is performed by the image sensor 103 in this embodiment. FIG. 4A shows that a pixel G1[n+1] and a pixel G1[n+3] are added and averaged to generate a pixel G1[K+1].

Figure 5:
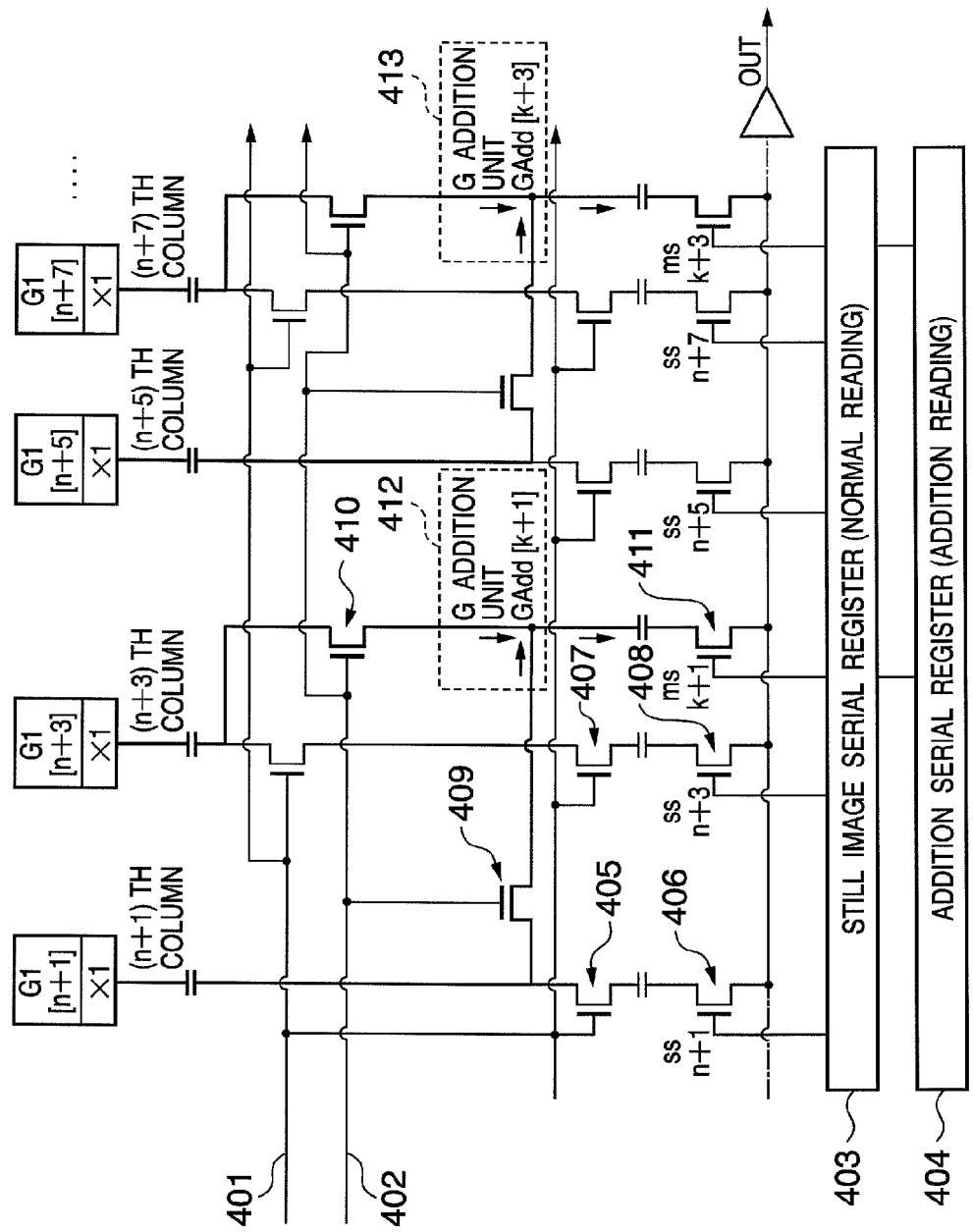
FIG. 5 is a circuit diagram showing an example of the schematic arrangement of a G1 shift register in an RG horizontal shift register according to the first embodiment of the present invention.

FIG. 5 is a view showing an example of the schematic arrangement of a G1 shift register in the RG horizontal shift register 103a.

Referring to FIG. 5, in the normal reading mode, each pixel G1[n+1] is sequentially output by a still image select (s select) signal 401 and a still image serial register 403 through transistors 405 and 406. In the normal reading mode, each pixel G1[n+3] is sequentially output by a still image select signal 401 and the still image serial register 403 through transistors 407 and 408.

In the addition reading mode, the pixels G1[n+1] and G1[n+3] are added and averaged by an addition select (m select) signal 402 through transistors 409 and 410 in a G addition unit (adding and averaging circuit GAdd[k+1]) 412, and output by an addition serial register 404 through transistors 411. Likewise, the pixel G1[n+5] and the pixel G1[n+7] are added and averaged by a G addition unit (adding and averaging circuit GAdd[k+3]) 413. The above operation can be expressed, for example, by $$G1[K+1] = (G1[n+1] + G1[n+3])/2 \qquad (1)$$

$$G1[K+3] = (G1[n+5] + G1[n+7])/2$$

$$\vdots$$

Subsequently, three adjacent pixels R of the same color are added and averaged, and the resultant pixel is transferred to the RG horizontal shift register 103a. FIG. 4A shows that pixels R[n+2], R[n+4], and R[n+6] are added and averaged to generate a pixel R[k+2].

Figure 6:
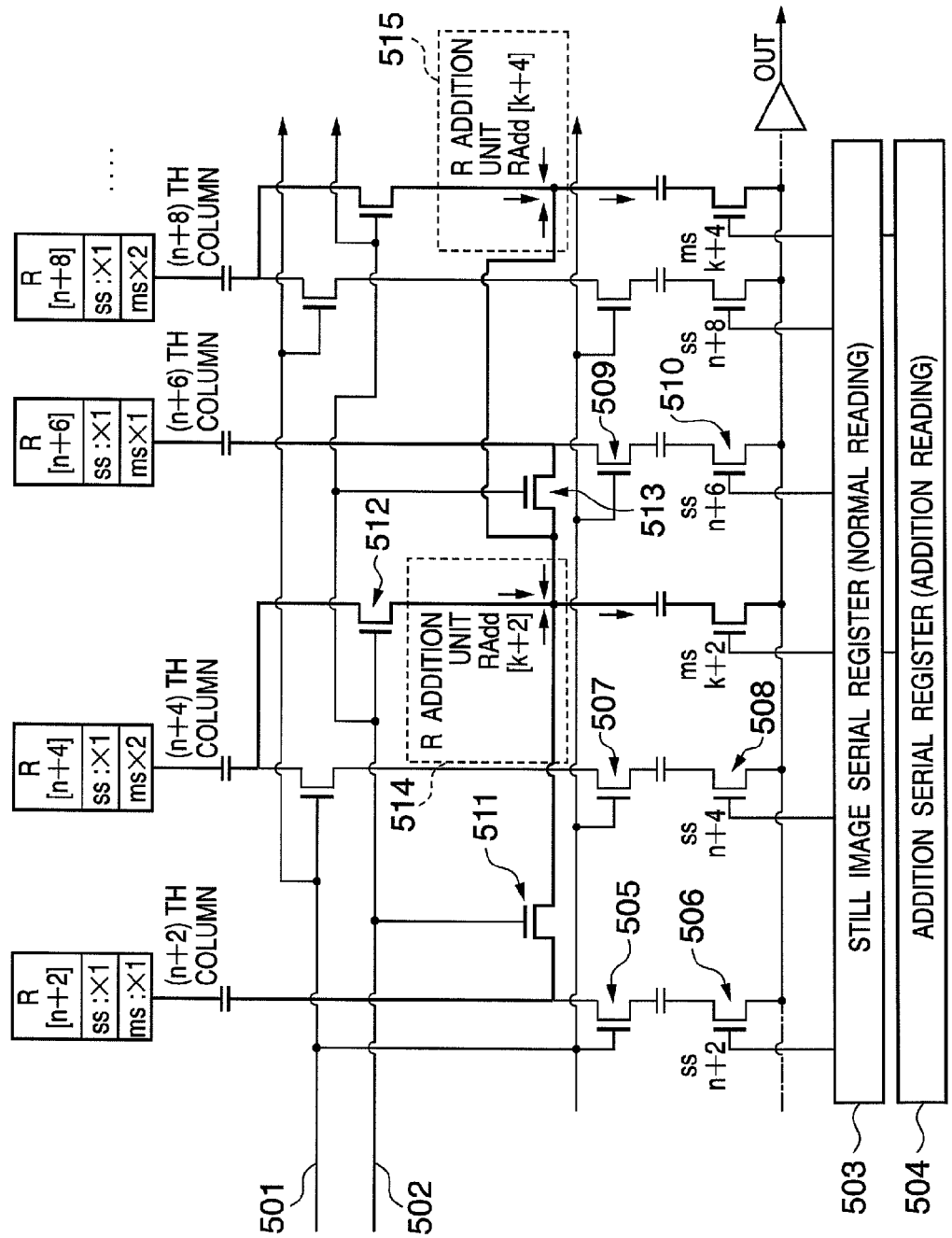
FIG. 6 is a circuit diagram showing the first example of the schematic arrangement of an R shift register in the RG horizontal shift register according to the first embodiment of the present invention.

FIG. 6 is a view showing an example of the schematic arrangement of an R shift register in the RG horizontal shift register 103a.

Referring to FIG. 6, in the normal reading mode, each pixel R[n+2] is sequentially output by a still image select (s select) signal 501 and a still image serial register 503 through transistors 505 and 506.

In the normal reading mode, each pixel R [n+4] is sequentially output by a still image select (s select) signal 501 and a still image serial register 503 through transistors 507 and 508.

In the normal reading mode, each pixel R[n+6] is sequentially output by the still image select (s select) signal 501 and the still image serial register 503 through transistors 509 and 510.

In the addition reading mode, the pixels R[n+2], R[n+4], and R[n+6] are added and averaged by an addition select (m select) signal 502 and an addition serial register 504 through transistors 511, 512, and 513 in an R addition unit (adding and averaging circuit RAdd[k+2]) 514. Likewise, the pixels R[n+6], R[n+8], and R[n+10] are added and averaged by an R addition unit (adding and averaging circuit RAdd[K+4]) 515.

The above operation can be expressed, for example, by $$R[K+2] = (\alpha \times R[n+2] + \beta \times R[n+4] + \Upsilon \times R[n+6])/4 \quad (2)$$
$$R[K+4] = (\alpha \times R[n+6] + \beta \times R[n+8] + \Upsilon \times R[n+10])/4$$
$$\vdots$$

In this case, the coefficients α and γ are both "1" (α=γ=1), and the coefficient β is "2" (β=2). These coefficients are multiplied on pixels in the processing of (Step 1-2) described above.

The pixels obtained by the above adding and averaging operation and transferred to the RG horizontal shift register 103a are sequentially transferred and output from the RG horizontal shift register 103a.

An example of pixel adding operation on the G2-B (a line whose number V in the vertical direction in FIG. 2 is an even number) will be described below. Note that since the same arrangement and operation as those for the R-G1 line described with reference to FIGS. 5 and 6 are applied to the G2-B line, adding operation will be briefly described, and a detailed description thereof will be omitted.

Two adjacent pixels G2 of the same color are added and averaged, and the resultant pixel is transferred to the GB horizontal shift register 103b. FIG. 4B is a view showing that pixels G2[n] and G2[n+2] are added and averaged to generate a pixel G2[K]. This operation can be expressed, for example, by $$G2[K] = (G2[n] + G2[n+2])/2 \quad (3)$$
$$G2[K+2] = (G2[n+4] + G2[n+6])/2$$
$$\vdots$$

Subsequently, three adjacent pixels B of the same color are added and averaged, and the resultant pixel is transferred to the GB horizontal shift register 103b. FIG. 4B shows that pixels B[n+1], B[n+3], and B[n+5] are added and averaged to generate a pixel B[k+1]. This operation can be expressed, for example, by $$B[K+1] = (\alpha \times B[n+1] + \beta \times B[n+3] + \Upsilon \times B[n+5])/4 \quad (4)$$
$$B[K+3] = (\alpha \times B[n+5] + \beta \times B[n+7] + \Upsilon \times B[n+9])/4$$
$$\vdots$$

In this case, the coefficients α and γ are both "1" (α=γ=1), and the coefficient a is "2" (β=2). These coefficients are multiplied on pixels in the processing of (Step 1-2) described above.

The pixels obtained by the above adding and averaging operation and transferred to the GB horizontal shift register 103b are sequentially transferred and output from the GB horizontal shift register 103b.

In this embodiment, as described above, different gains are applied for each pixel unit in the image sensor 103, and pixels of the same colors are added and averaged after a gain is periodically applied to each pixel. This makes it possible to obtain a low-pass filter effect before thinning processing is performed for the pixels in the sensor, thereby preventing the occurrence of aliasing (moiré) due to thinning.

In addition, R and B signals are added and averaged along the horizontal direction three pixels at a time, and G signals are added and averaged along the horizontal direction two pixels at a time. This can prevent the pixel position relationships between the G and R signals and between the G and B signals from being reversed. This can greatly prevent the occurrence of jaggies due to the reversal of pixel positions which occurs in the conventional addition reading mode.

In this embodiment, an amplifier is provided for each pixel to apply a gain for each pixel. However, as shown in FIG. 7, a vertical transfer line may include an amplifier capable of applying a gain to each pixel.

Figure 7:
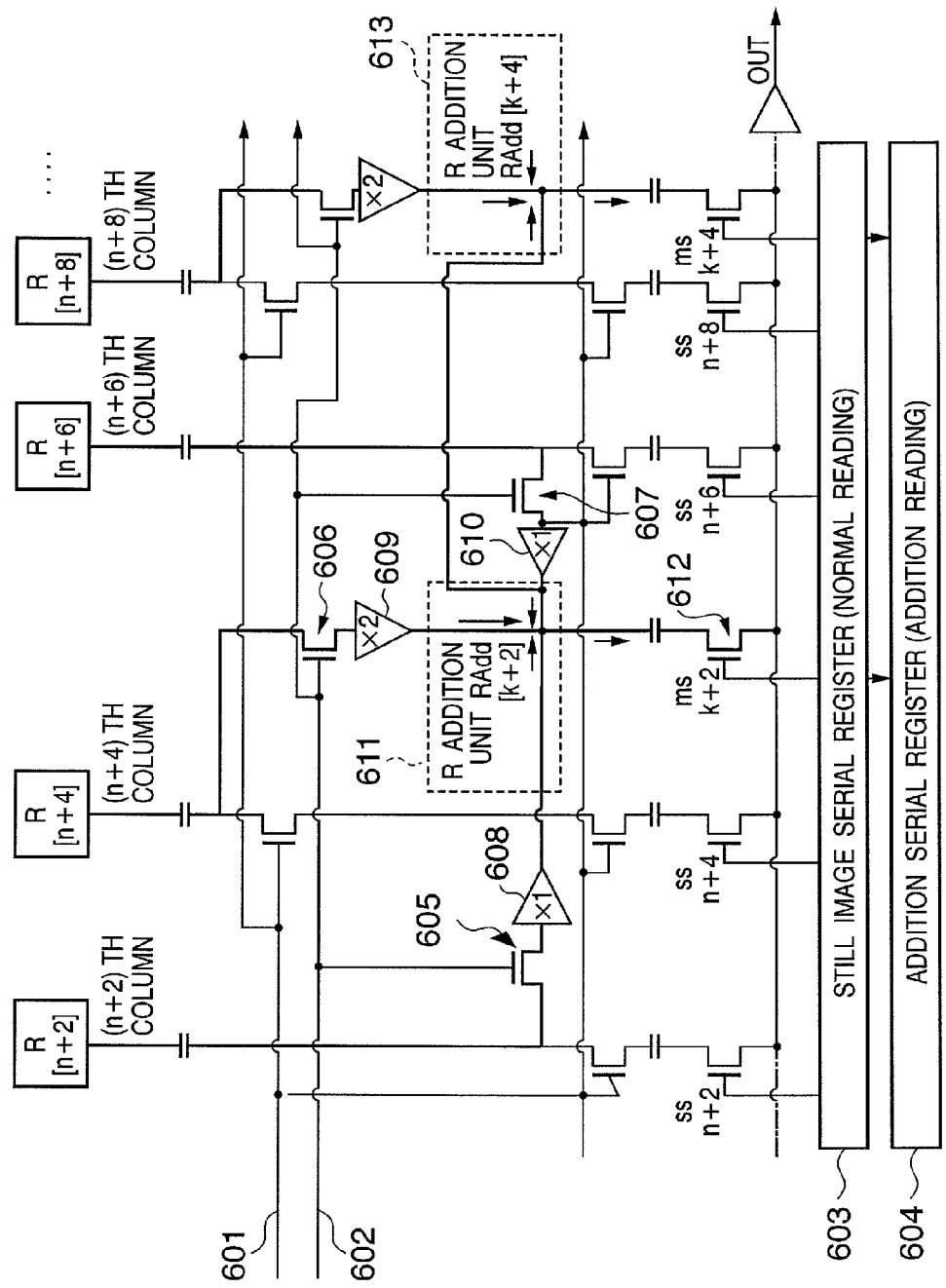
FIG. 7 is a circuit diagram showing the second example of the schematic arrangement of the R shift register in the RG horizontal shift register according to the first embodiment of the present invention.

Referring to FIG. 7, reading operation in the normal mode is performed by a still image select (s select) signal 601, and reading operation in the addition mode is performed by an addition select (m select) signal 602.

When reading operation in the addition mode is performed by the addition select (m select) signal 602, a 1× gain is applied to the pixel R[n+2] by an amplifier 608 through a transistor 605. A 2× gain is applied to the pixel R[n+4] by an amplifier 609 through a transistor 606. The pixel R[n+6] passes through a transistor 607, and an amplifier 610 applies a 1× gain to the pixel.

The pixels R[n+2], R[n+4], and R[n+6] after gain correction are added and averaged by an R addition unit (adding and averaging circuit Radd[K+2]) 611, and the resultant pixel is output as a pixel R[K+2] through a transistor 612. The arrangement shown in FIG. 7 requires a selector for applying different gains for the respective colors. However, there is no need to hold an amplifier for each pixel, and hence the chip area can be reduced. Note that the same adding and averaging operation as that described above is performed in an R addition unit (adding and averaging circuit Radd[K+4]) 613.

In this embodiment, adding processing and thinning processing are performed within the image sensor 103. Obviously, however, an image with little aliasing can be obtained by reading out all pixels from the image sensor 103 in the still image mode and performing adding/thinning processing by using a program in the image capturing apparatus or a PC (Personal Computer).

Second Embodiment

The second embodiment of the present invention will be described next. This embodiment performs adding processing in the sensor vertical direction in addition to adding processing in the sensor horizontal direction in the first embodiment, thereby preventing a deterioration in image quality due to thinning processing in the vertical direction. As described above, this embodiment differs from the first embodiment in that adding processing is performed in the sensor vertical direction, but other arrangements are the same. The same reference numerals in FIGS. 1 to 7 as in the first embodiment denote the same portions in the second embodiment, and a detailed description thereof will be omitted.

In an image sensor 103, circuit arrangements for adding processing in the horizontal direction, of circuit arrangements for applying different gains for each pixel and circuit arrangements for pixel addition, are the same as those in the first embodiment. Since it is obvious that adding processing in the vertical direction can be realized by making the circuit arrangement of a vertical shift register have the same circuit arrangement as that of the horizontal shift register in the first embodiment, a detailed description thereof will be omitted (see FIGS. 5 to 7).

Figure 8:
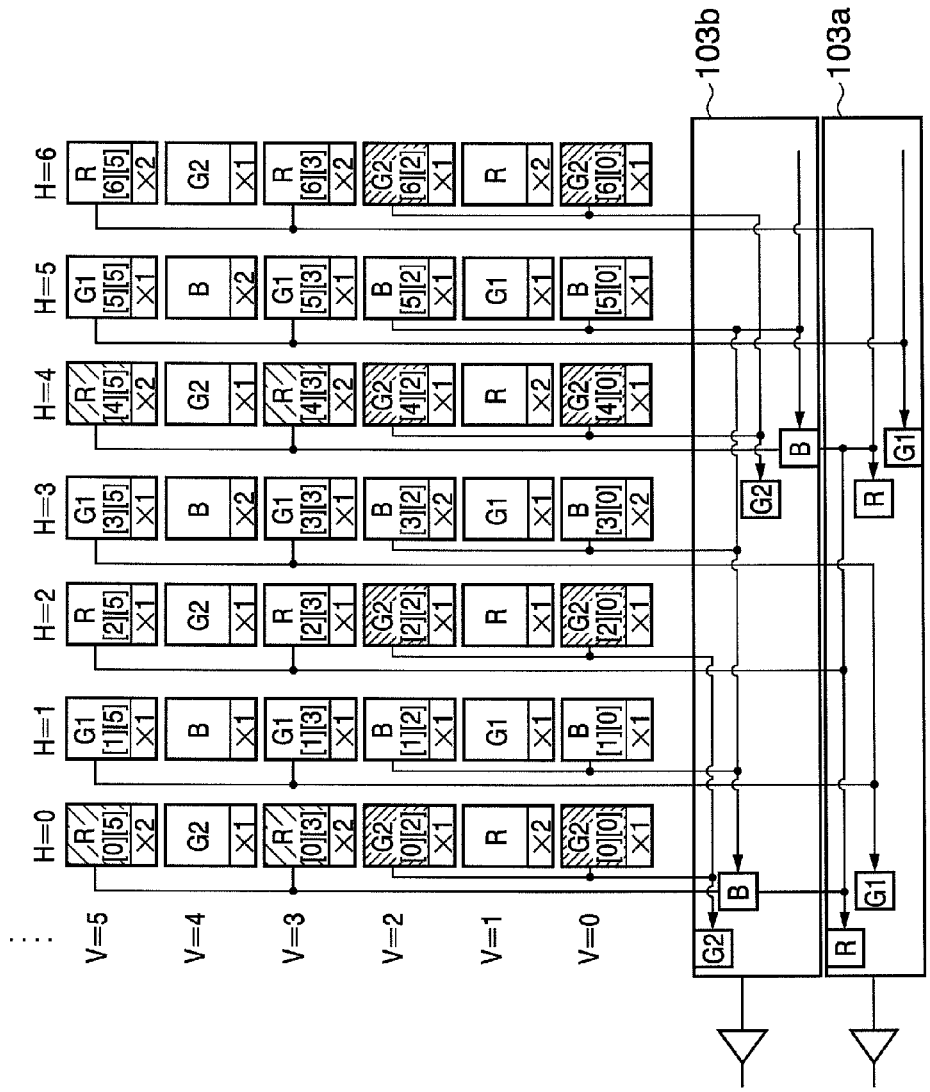
FIG. 8 is a view conceptually showing an example of a reading method in an addition mode according to the second embodiment of the present invention.

FIG. 8 is a view conceptually showing an example of a reading method in the addition mode in an image capturing apparatus according to this embodiment. Note that FIG. 8 shows an example in which an image sensor has a plurality of pixels arranged in the form of a six (row)×7 (column) matrix. Referring to FIG. 8, R, G1, G2, and B represent the colors of pixels (R representing red; G1 and G2, green; and B, blue), and "x1" and "x2" shown under R, G1, G2, and B represent gains (amplification factors) applied to the respective pixels.
(Step 2-1)

First of all, an object image passing through an optical system upon exposure operation is formed on the image sensor 103. As in the first embodiment, a photodiode 203 placed in each pixel of the image sensor 103 then outputs an electrical signal (current) corresponding to a light amount.
(Step 2-2)

On an R-G1 line (a line whose number V in the vertical direction is an odd number, V=2m+1 (where m is 0 or a positive integer)), an amplifier applies a x2 gain to an electrical signal at an R pixel at a position where a number H in the horizontal direction satisfies H=4n (where n is 0 or a positive integer). On a G2-B line (a line whose number V in the vertical direction is an even number, V=2m (where m is 0 or a positive integer)), an amplifier applies a x2 gain to an electrical signal at a B pixel at a position where a number H in the horizontal direction satisfies H=4n+3 (where n is 0 or a positive integer). Assume that the gain amount at each of the remaining pixels is x1.
(Step 2-3)

In vertical transfer operation, pixels of the same colors are added. Referring to FIG. 8, pixels on a line whose number V in the vertical direction satisfies V=6n (n is 0 or a positive integer) and pixels on a line which satisfies V=6n+2 (n is 0 or a positive integer) are added and averaged in the vertical direction. In addition, pixels on a line whose number V in the vertical direction satisfies V=6n+3 (n is 0 or a positive integer) and pixels on a line which satisfies V=6n+5 (n is 0 or a positive integer) are added and averaged in the vertical direction. Furthermore, pixels on a line whose number V in the vertical direction satisfies V=6n+1 (n is 0 or a positive integer) and pixels which satisfies V=6n+4 (n is 0 or a positive integer) are skipped.
(Step 2-4)

In an RG horizontal shift register 103a and GB horizontal shift register 103b, pixels of the same colors are added. At this time, pixel values from an even-numbered line (G2-B line) and an odd-numbered line (R-G1 line) in the vertical direction are transferred to different horizontal shift registers (the RG horizontal shift register 103a and the GB horizontal shift register 103b), and different pixel adding operations are executed in the respective registers. The resultant data are then transferred in the horizontal direction. Since a method of adding pixels in the horizontal shift registers in this embodiment is the same as that in the first embodiment, a description thereof will be omitted.

As described above, according to this embodiment, even if adding and averaging operation is performed in both the sensor horizontal direction and the sensor vertical direction, the positional relationship between the pixels of G and R signals and between G and B signals can be prevented from being reversed. This can prevent the occurrence of jaggies. In addition, since four pixels of the same color are added, an image signal with little noise can be output.

In this embodiment as well, adding processing and thinning processing are performed within the image sensor 103. Obviously, however, an image with little aliasing can be obtained by reading out all pixels from the image sensor 103 in the still image mode and performing adding processing and thinning processing on a program in the image capturing apparatus or a PC (Personal Computer).

Third Embodiment

The third embodiment of the present invention will be described next. This embodiment is characterized in that after gains having a common pattern are applied to pixels of each color first and the pixels of the same colors are added and averaged in a horizontal shift register to obtain a low-pass filter effect, the pixels are thinned and read out. This embodiment is also characterized in that the period of a gain applied to pixels of the same color is changed in accordance with a thinning ratio. Other arrangements are the same as those in the first and second embodiments. Therefore, the same reference numerals in FIGS. 1 to 8 as in the first and second embodiments described above denote the same portions in the third embodiment, and a detailed description thereof will be omitted.

Figure 9:
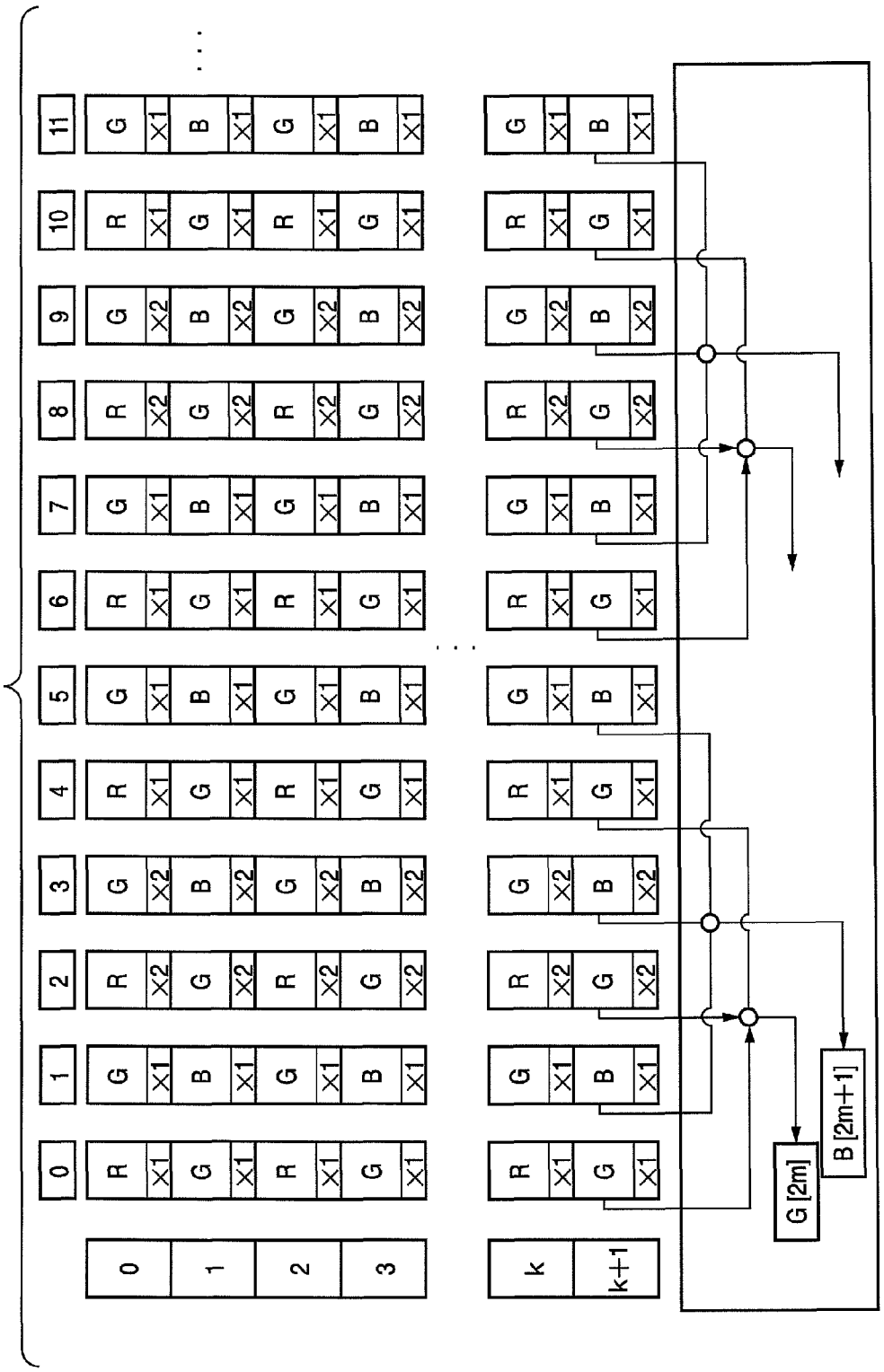
FIG. 9 is a view conceptually showing an example of a method of reading out pixels upon thinning of the pixels to ⅓ in the horizontal direction in the addition mode according to the third embodiment of the present invention.

FIG. 9 is a view conceptually showing an example of a method of reading out pixels upon thinning them to ⅓ in the horizontal direction in the addition mode in an image sensor according to this embodiment.

Referring to FIG. 9, R, G1, G2, and B represent the colors of pixels (R representing red; G1 and G2, green; and B, blue), and "x1" and "x2" shown under R, G1, G2, and B represent gains (amplification factors) applied to the respective pixels shown thereon.
(Step 3-1)

First of all, an object image passing through an optical system upon exposure operation is formed on an image sensor 103. A photodiode 203 placed in each pixel of the image sensor 103 outputs an electrical signal (current) corresponding to a light amount.
(Step 3-2)

As shown in FIG. 9, gains having a predetermined pattern set in advance for pixels of each color are applied by amplification circuits (amplifiers) provided for the respective pixels like those described in the first embodiment. Referring to FIG. 9, gains having a regularity of (x1, x2, x1) are applied in the horizontal direction.
(Step 3-3)

Vertical transfer is started.
(Step 3-4)

The horizontal shift register adds pixels of the same colors and then outputs the resultant pixels.

An example of pixel adding operation on a G-B line (a line whose number k in the vertical direction in FIG. 9 is an odd number) will be described.

More specifically, for example, addition is executed by equations (5) given below:

$$G[2m]=(G[6n]+G[6n+2]+G[6n+4])/4$$

$$B[2m+1]=(B[6n+1]+B[6n+3]+B[6n+5])/4 \quad (5)$$

An example of pixel adding operation on an R-G line (line whose number k in the vertical direction in FIG. 9 is an even number) will be described next.

As in the case of the G-B line, addition is executed by, for example, equation (6) given below:

$$G[2m+1]=(G[6n+1]+G[6n+3]+G[6n+5])/4$$

$$R[2m]=(R[6n]+R[6n+2]+R[6n+4])/4 \quad (6)$$

After data are output from the sensor in this manner, the number of pixels in the horizontal direction is reduced to ⅓. In order to perform thinning in the vertical direction, the vertical shift register may perform adding and averaging processing like that performed by the horizontal shift register as in the second embodiment.

Figure 10:
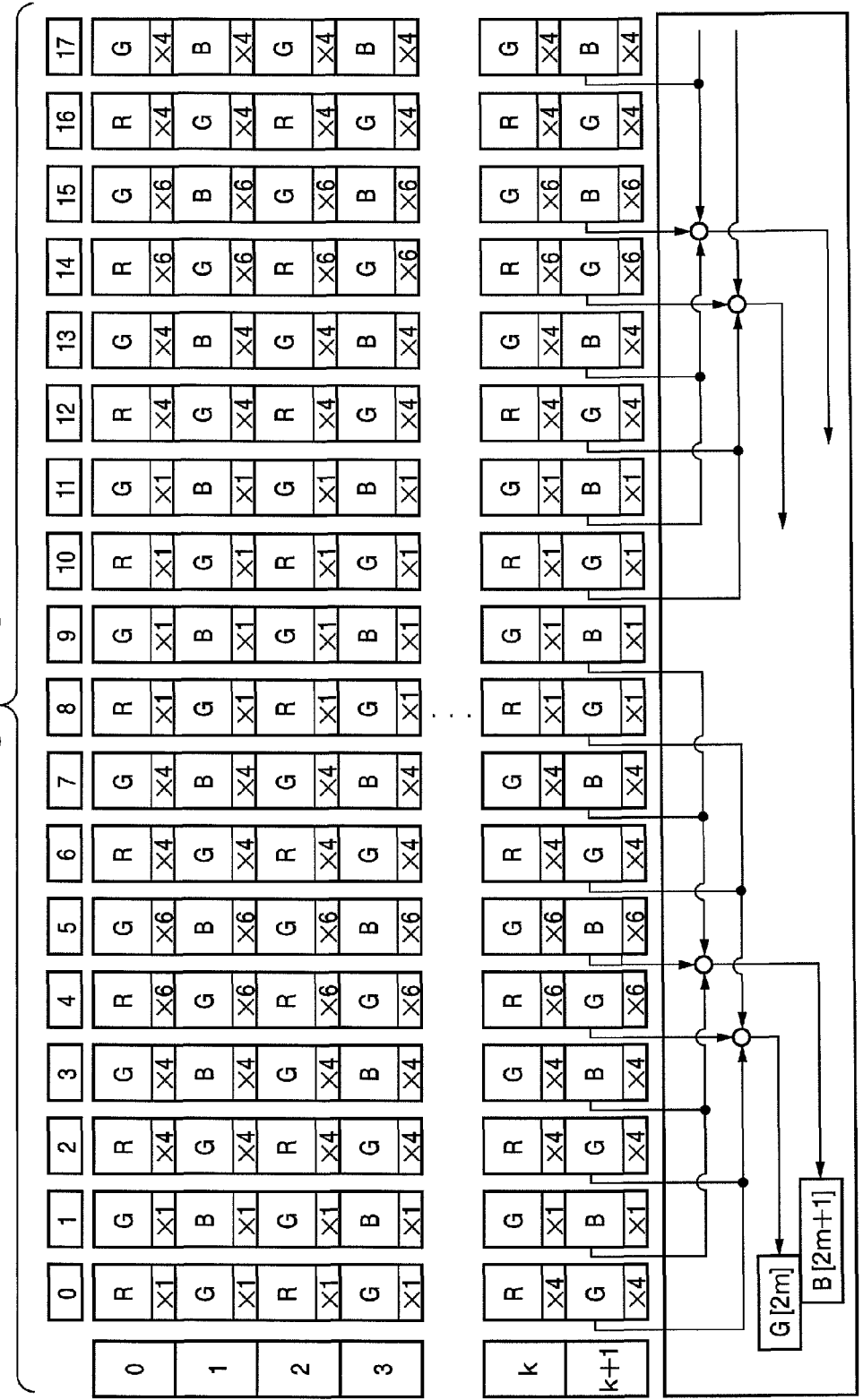
FIG. 10 is a view conceptually showing an example of a method of reading out pixels upon thinning of the pixels to ⅕ in the horizontal direction in the addition mode according to the third embodiment of the present invention.
Figure 11:
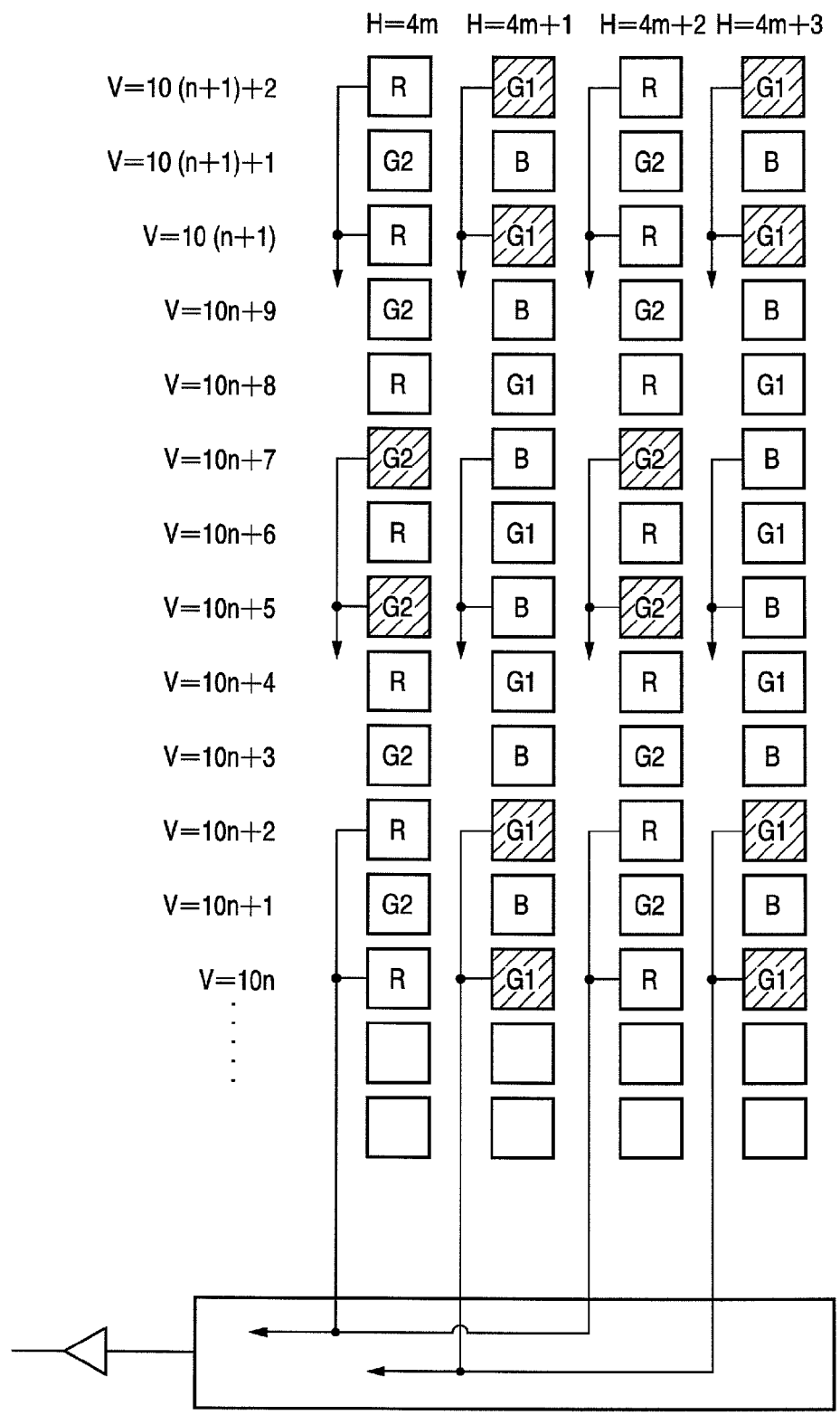
FIG. 11 is a view for explaining a conventional method of reading out signals from a general-purpose CCD image sensor in a moving image photography mode according to the prior art.

A case wherein a mode of reading out pixels upon thinning them to ⅕ in the horizontal direction is set will be described next. FIG. 10 is a view conceptually showing an example of the method of reading out pixels upon thinning them to ⅕ in the horizontal direction in the addition mode in the image sensor in this embodiment. Referring to FIG. 10, R, G1, G2, and B represent the colors of pixels (R representing red; G1 and G2, green; and B, blue), and "x1", "x4", and "x6" shown under R, G1, G2, and B represent gains (amplification factors) applied to the respective pixels. As is obvious from FIGS. 9 and 10, in the mode of thinning pixels to ⅓, regular gains to be applied to pixels of the same colors in the horizontal direction have a three-pixel period. In contrast to this, in the mode of thinning pixels to ⅕, gains have a five-pixel period. As described above, in this embodiment, the period of the pattern of gains is increased as the thinning ratio increases.

(Step 4-1)

An object image passing through the optical system upon exposure operation is formed on the image sensor. A photodiode placed in each pixel of the image sensor outputs an electrical signal (current) corresponding to a light amount.

(Step 4-2)

As shown in FIG. 10, gains having a predetermined pattern set in advance for pixels of each color are applied by amplification circuits (amplifiers) provided for the respective pixels like those described in the first embodiment. Referring to FIG. 10, gains having a regularity of (x1, x4, x6, x4, x1) are applied in the horizontal direction.

(Step 4-3)

Vertical transfer is started.

(Step 4-4)

The horizontal shift register adds pixels of the same colors and then outputs the resultant pixels.

An example of pixel adding operation on a G-B line (a line whose number k in the vertical direction in FIG. 10 is an odd number) will be described.

More specifically, for example, addition is executed by equations (7) given below:

$$G[2m]=(G[10n]+G[10n+2]+G[10n+4]+G[10n+6]+G[10n+8])/16$$

$$B[2m+1]=(B[10n+1]+B[10n+3]+B[10n+5]+B[10n+7]+B[10n+9])/16 \quad (7)$$

An example of pixel adding operation on an R-G line (line whose number k in the vertical direction in FIG. 10 is an even number) will be described next.

As in the case of the G-B line, addition is executed by, for example, equations (8) given below:

$$G[2m+1]=(G[10n+1]+G[10n+3]+G[10n+5]+G[10n+7]+G[10n+9])/16$$

$$R[2m]=(R[10n]+R[10n+2]+R[10n+4]+R[10n+6]+R[10n+8])/16 \quad (8)$$

After data are output from the sensor in this manner, the number of pixels in the horizontal direction is reduced to ⅕. In order to perform thinning in the vertical direction, the vertical shift register may perform adding and averaging processing like that performed by the horizontal shift register as in the second embodiment.

As described above, in this embodiment, the period of periodic gains is changed depending on a thinning ratio, aliasing due to adding/thinning operation can be reduced more reliably in addition to the effects of the first and second embodiments.

In this embodiment as well, adding processing and thinning processing are performed within the image sensor 103. Obviously, however, an image with little aliasing can be obtained by reading out all pixels from the image sensor 103 in the still image mode and performing adding processing and thinning processing on a program in the image capturing apparatus or a PC (Personal Computer).

According to the embodiment described above, after pixel signals are amplified by amplification factors having a regular pattern set for a plurality of pixels arranged in the form of a matrix, the pixel signals of the same colors are thinned upon adding and averaging operation. This makes it possible to obtain a low-pass filter effect before thinning processing for the pixels, thereby preventing aliasing due to thinning as much as possible.

In addition, R signals on the R-G line are added and averaged three pixels at a time, and G signals are added and averaged two pixels at a time. On the other hand, B signals on the G-B line are added and averaged three pixels at a time, and G signals are added and averaged two pixels at a time. This can prevent the pixel position relationships between the G and R signals and between the G and B signals from being reversed as much as possible. This can prevent the occurrence of jaggies as much as possible.

Other Embodiment of the Present Invention

The present invention also incorporates the following arrangement within its category. In this arrangement, in order to make the respective devices to operate so as to realize the functions of the above embodiments, the program codes of software for realizing the functions of the above embodiments are supplied to a computer in an apparatus or system connected to the respective devices, thereby causing the computer (CPU or MPU) in the system or apparatus to operate the respective devices in accordance with the program codes.

In this case, the program codes of the software themselves realize the functions of the above embodiments, and the program codes themselves and a means for supplying the program codes to the computer, i.e., a recording medium in which the program codes are stored, constitute the present invention. As a recording medium storing such program codes, for example, a flexible disk, hard disk, optical disk, magnetooptical disk, CD-ROM, magnetic tape, non-volatile memory card, ROM, or the like can be used.

Obviously, the above program codes are included in the embodiments of the present invention not only in a case wherein the functions of the above embodiments are realized when the computer executes the supplied program codes but also in a case wherein the functions of the above embodiments are realized by the program codes in cooperation with the OS (Operating System), another application software, or the like running on the computer.

In addition, the present invention incorporates a case wherein the supplied program codes are stored in the memory of a function expansion board in the computer or a function expansion unit connected to the computer, the CPU of the function expansion board or function expansion unit performs part or all of actual processing on the basis of the instructions of the program codes, and the functions of the above embodiments are realized by the processing.

As many apparently widely different embodiments of the present invention can be made without departing from the spirit and scope thereof, it is to be understood that the invention is not limited to the specific embodiments thereof except as defined in the appended claims.

What is claimed is:

1. An image capturing apparatus comprising:
   an image sensor that includes a plurality of pixels arranged in the form of a matrix, wherein each pixel in the plurality of pixels includes a photoelectric conversion unit, an amplifying unit that amplifies pixel signals output from the photoelectric conversion units, and an addition unit that adds the pixel signals of the same color amplified by the amplifying unit; and
   a control unit that controls the amplifying unit to amplify the pixel signals with amplification factors that are independently set for each pixel, when the pixel signals of the same color are added by the addition unit.

2. The image capturing apparatus according to claim 1, wherein a number of pixel signals to be added by the addition unit is different for each color.

3. The image capturing apparatus according to claim 1, wherein the control unit reads out the pixel signals by thinning the pixel signals output from the image sensor with a predetermined thinning factor.

4. The image capturing apparatus according to claim 3, wherein the amplification factors are independently set for each pixel in accordance with the thinning factor.

* * * * *